United States Patent
Kramer

(10) Patent No.: US 7,395,723 B1
(45) Date of Patent: Jul. 8, 2008

(54) TORQUE APPLYING AND MEASURING ACCESSORY FOR USE WITH CAPPED CONTAINERS

(75) Inventor: Jim Kramer, Bulger, PA (US)

(73) Assignee: All-Pak, Inc., Bridgeville, PA (US)

( * ) Notice: Subject to any disclaimer, the term of this patent is extended or adjusted under 35 U.S.C. 154(b) by 0 days.

(21) Appl. No.: 11/819,181

(22) Filed: Jun. 26, 2007

(51) Int. Cl.
*B25B 23/14* (2006.01)
*G01L 5/24* (2006.01)
*B67B 7/14* (2006.01)
*B67B 7/18* (2006.01)

(52) U.S. Cl. .................... 73/862.21; 81/3.4
(58) Field of Classification Search ........... 73/862.21; 81/3.4

See application file for complete search history.

(56) References Cited

U.S. PATENT DOCUMENTS

| | | | |
|---|---|---|---|
| 2,300,288 A | 10/1942 | Hullhorst | |
| 2,552,407 A | 5/1951 | Crabbe | |
| 3,587,307 A | 6/1971 | Newberg | |
| 3,866,463 A | 2/1975 | Smith et al. | |
| 4,539,852 A | 9/1985 | Feld | |
| 4,989,459 A * | 2/1991 | Faber, Jr. | 73/862.23 |
| 5,152,182 A | 10/1992 | Searle | |
| 5,161,416 A * | 11/1992 | Avant et al. | 73/862.21 |
| 5,271,296 A * | 12/1993 | Parent et al. | 81/3.2 |
| 5,329,831 A * | 7/1994 | Pierce et al. | 81/3.43 |
| 5,415,050 A * | 5/1995 | Trendel et al. | 73/862.23 |
| 5,546,831 A * | 8/1996 | Grant et al. | 81/3.44 |
| 6,393,947 B1 * | 5/2002 | Corcoran et al. | 81/3.31 |
| 6,910,390 B2 | 6/2005 | Semersky | |
| 7,155,999 B1 * | 1/2007 | Helfet | 81/64 |
| 2005/0188911 A1 | 9/2005 | Manke | |

* cited by examiner

*Primary Examiner*—Michael Cygan
*Assistant Examiner*—Octavia Davis
(74) *Attorney, Agent, or Firm*—Terry M. Gernstein

(57) ABSTRACT

An accessory for coupling a torque measuring device to a container cap, especially a smooth sided closure. The accessory includes two clamp elements movably coupled together by a threaded rod so the clamps can be forced into frictional engagement with a cap. A mount block is included for coupling the torque measuring device to the clamps so cap closing torque can be measured using an inexpensive and easily used device. This device will be especially useful for laboratories, fillers and shippers of containers that have been closed with a cap having a certain amount of closure torque so the user can demonstrate to DOT that the closing torque is in the proper range.

10 Claims, 3 Drawing Sheets

TORQUE APPLYING AND MEASURING ACCESSORY FOR USE WITH CAPPED CONTAINERS

TECHNICAL FIELD OF THE INVENTION

The present invention relates to the general art of containers, and to the particular field of capped containers.

BACKGROUND OF THE INVENTION

In the manufacture of containers comprising combinations of screw-type closures with associated containers, it often becomes necessary or desirable to determine the degree to which the threaded closure complies with applicable torque specifications. For example, in some situations, the torque with which a threaded closure is applied must be of a certain magnitude in order to properly seal the container so the closure does not become loose during shipment. This is especially critical if hazardous material is being shipped. Also, in the packaging of pharmaceutical products, since they can be toxic in the wrong dosages, dosage requirements are somewhat critical and it is often either required, or deemed desirable, to have a child-proof safety closure limiting access to the container contents. Such safety closures may, for example, comprise a threaded inner cap for being threaded directly to the finish of a container and an overlap loosely retractable relative to the inner cap. A user must push the outer cap axially onto the inner cap to engage a ratchet mechanism to be able to simultaneously turn the inner cap.

During the manufacture of products packaged in containers having threaded closures, the caps may be applied with a capping machine which must be adjusted from time to time to compensate for normal mechanical or component variations which may affect application of torque. Normally, periodic control checks are conducted on the packages being produced. During a particular production run, an operator may periodically remove a completed sample product to determine the degree of torque required to remove a threaded closure from an associated container. A removal torque which falls outside a predetermined range indicates the capping mechanism or other components of the manufacturing process must be adjusted or replaced.

There are known prior art devices and methods for effecting quality control torque tests of threaded closures to determine the amount of torque required to remove the closure from the threaded finish of the container. One of the standards of the industry is known as the Owens-Illinois Torque Meter manufactured by Secure Pak, Inc., Toledo, Ohio. There are also bench top torque measuring devices wherein the container is placed and squeezed to resist any rotational movement during the testing operation. The torque required to remove the associated closure is measured. To obtain the desired measurements the containers must be transported to and from the torque measuring devices. The manner in which the torque is applied varies from one operator to another. Consequently, torque data thus produced may be non-uniform and non-reliable in comparison to industry standards.

In certain situations, packages being used to transport hazardous materials are tested and approved by the Department of Transportation (DOT). The DOT has specific instructions and requirements for compliance to DOT standards associated with the shipment of such materials. In recent times, DOT has begun to audit and inspect the end users of these packages. The DOT has been requiring assurance from these end users that the closure torque stated by the end user in reply to a DOT question is accurate. If the end user cannot supply such assurance to the satisfaction of DOT, significant fines may be assessed. While, as discussed above, there are machines for measuring such closure torque, the machines known to the inventor are expensive, cumbersome to use, and not at all mobile whereby an end user or transport driver will not have easy access to such a device. At the present time, the inventor is not aware of any device that can expeditiously and accurately verify the closing torque of the containers in such a shipment.

Still further, some containers are closed by smooth-sided caps. With no ribbing or such to grab or hold on the outside of the closure, a mold maker cannot make an inverted mold of the closure to grab and hold it. The inventor is not aware of any device which both satisfies the above-mentioned requirements and which is amenable for use on a smooth-sided closure.

SUMMARY OF THE INVENTION

The device and method embodying the present invention provides a reliable and easily used way to accurately apply closing torque to a container cover and to provide a reliable and easily stored and used way to accurately verify the amount of closing torque that has been applied to a container cover, even if the cover is smooth sided.

The device embodying the present invention includes two clamp elements that are moved toward and away from a closure cap by operation of a screw element. A mount block is mounted on the screw element and has a bore which is sized and adapted to accommodate a torque wrench or a device for measuring torque. The bore is thus connected to the closure cap via the screw element and the mount blocks. Attaching a torque wrench or a torque measuring device to the cap is thus easily effected by simply attaching the wrench or the device to the bore. Torque applied by the wrench will thus be transferred to the cap. Opening torque can also be measured by attaching a torque measuring device to the same bore.

The device is easily manufactured, easily stored and easily used, yet will provide accurate results. The device allows users to properly secure closures at the correct degree of torque to ensure a proper seal. Anyone, including the entity applying the closure, such as a lab filling the bottle and placing it in it's transport package responding to an audit, can easily provide an accurate response to DOT inquiries about the amount of closure torque for the containers in the shipment, which response will be reliable and repeatable. In some cases, even a driver of a transport vehicle could supply this information because the device of the present invention is easily stored.

Unlike large bench-top torque measuring devices, this system is lightweight, portable, easy to store, and more economical. One form of the closure adapter is made of durable Mycarda with an aluminum frame and a textured stainless steel adjuster. The device can accommodate closure styles ranging between 33 mm and 53 mm. The device can also be supplied in additional sizes. Rubber inserts on the device allow this system to be used for both smooth finish and ribbed closures.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
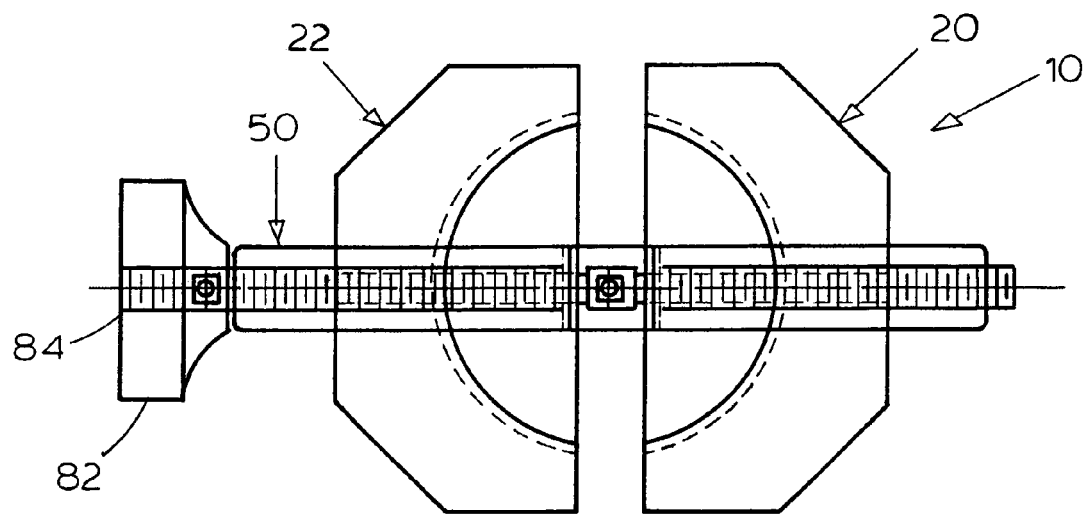
FIG. 1 is a top plan view of an accessory embodying the present invention.
Figure 2A:
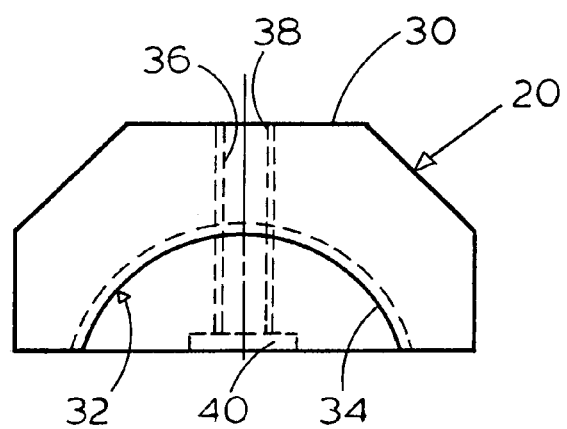
FIG. 2A is a top plan view of a clamp element.
Figure 2B:
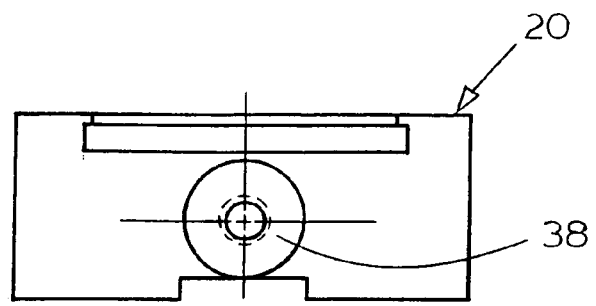
FIG. 2B is an elevational view of the clamp element shown in FIG. 2A.
Figure 3A:
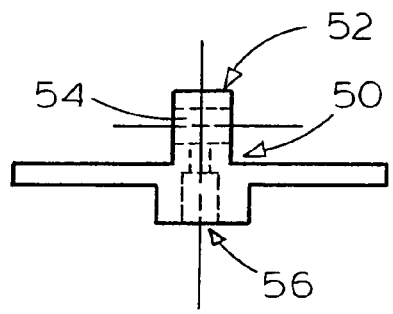
FIG. 3A is side elevational view of a mount block.
Figure 3B:
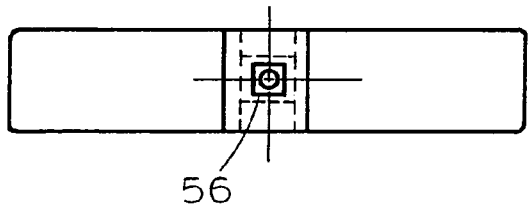
FIG. 3B is top view of the mount block shown in FIG. 3A.
Figure 3C:
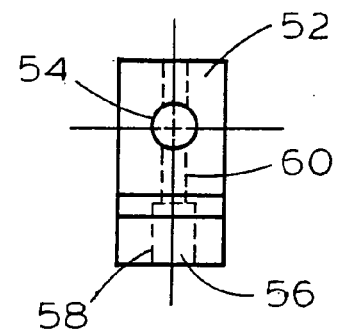
FIG. 3C is an end view of the mount block shown in FIG. 3A.
Figure 4:
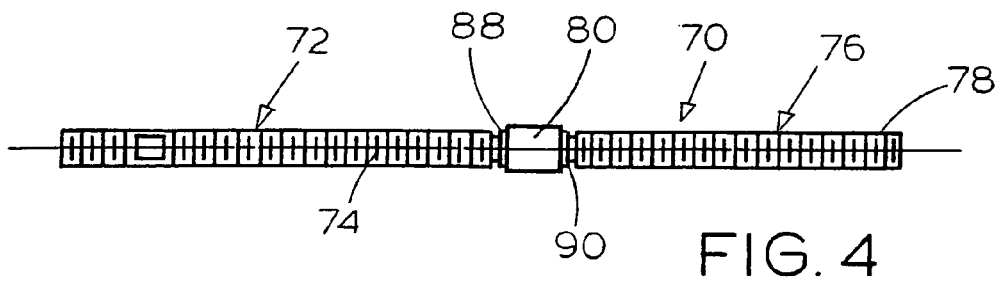
FIG. 4 is screw element.
Figure 5:
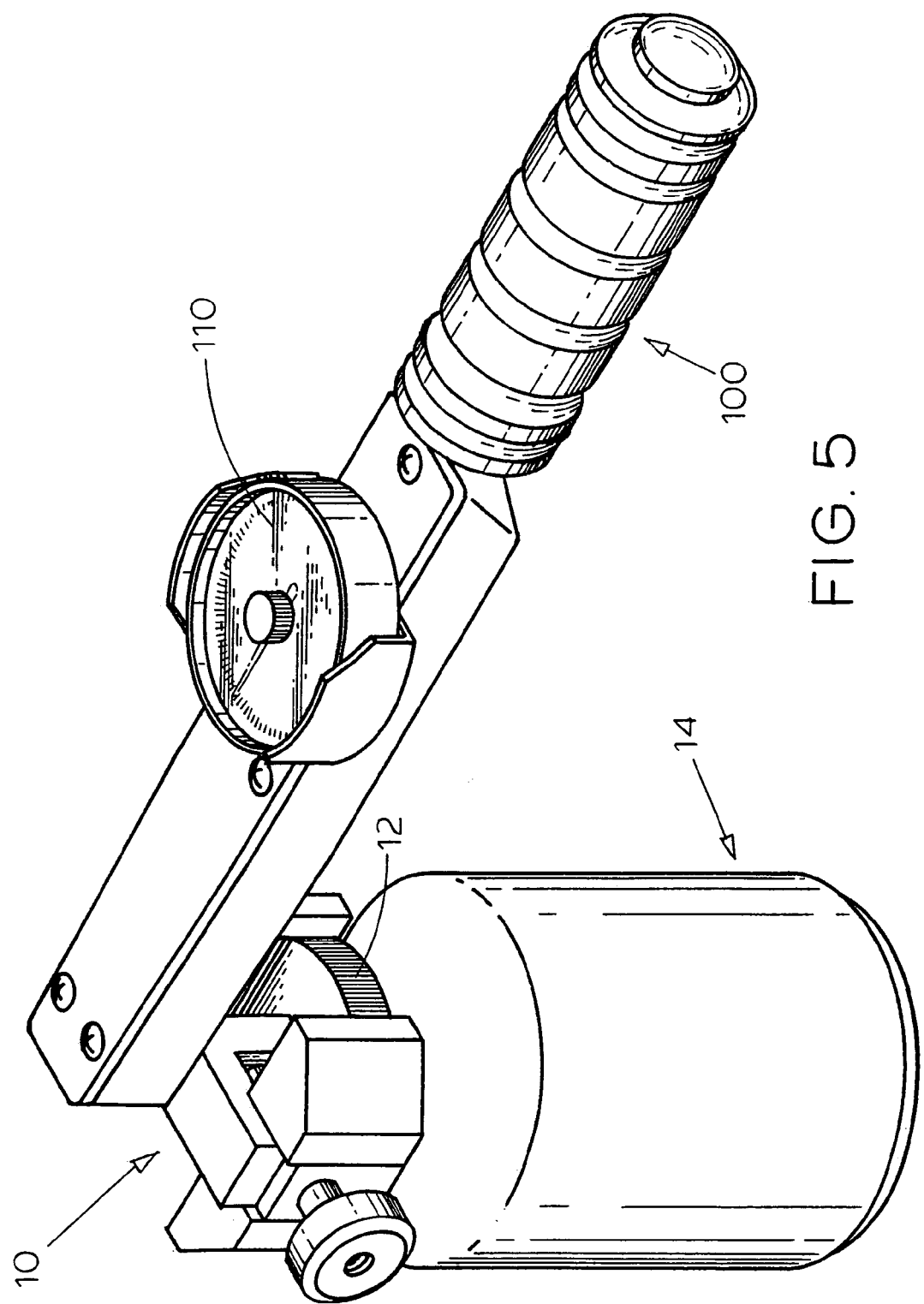
FIG. 5 shows a torque wrench and a torque measuring device coupled to a cap of a container via the accessory embodying the present invention

Referring to the figures, it can be understood that the present invention is embodied in an accessory 10 for use in applying closing torque to and measuring closing torque of a cap 12 of a capped container 14. The container can be used to store hazardous material and thus the cap must be applied to a torque as set by various Governmental Agencies. For example, if container 14 is used to store hazardous material during transport from one site to another, the Department of Transportation may have standard torques which must be met by the cap on the container. As discussed above, in some instances, a transporting vehicle may be stopped and the capped containers inspected during transport. A laboratory, filling or shipping operation may be audited by the Department of Transportation. In such a situation, the inspector may wish to know, with accuracy, the capping torque. Prior to the present invention, such information was difficult to supply; however, using accessory 10, the information can be easily and accurately supplied in a manner discussed below.

Accessory 10 comprises first and second clamp elements 20 and 22. The clamp elements are identical to each other, and thus, only clamp element 20 will be discussed, it being understood that the description for clamp element 20 will also apply to clamp element 22. Clamp element 20 includes a first face 30 which is an outer face when the clamp element is in use and a second face 32 which is located adjacent to cap 12 of container 14 when in use. Second face 32 includes an arcuate portion 34 which frictionally engages the cap of the container when the cap element is in use. A bore 36 extends between first face 30 and second face 32. A screw thread 38 is located on the clamp element adjacent to the bore. The screw thread on the first clamp element is adapted to accommodate a left hand screw thread and the screw thread on the second clamp element is adapted to accommodate a right hand screw thread. Clamp element 20 further includes a cutout area 40 for a purpose that will be understood from the teaching of the following disclosure.

Accessory 10 further comprises a mount block 50 which includes a body portion 52 which has a bore 54 defined therethrough. Bore 54 is aligned with bores 36 of clamp elements 20 and 22 when the mount block and the clamp elements are in use. A torque wrench accommodating bore 56 is defined in body portion 52 of the mount block. In the form shown, torque wrench accommodating bore 56 includes two bores, 58 and 60 with bore 60 being smaller than bore 58. Bore 56 receives and accommodates a torque applying element of a torque wrench to couple that wrench to the accessory.

Accessory 10 further comprises a screw element 70 which is accommodated in the bores of the clamp elements and the mount block to couple the clamp elements together and the mount block to the clamp element. Screw element 70 includes a first portion 72 having a left hand screw thread 74 thereon and which threadably engages the left hand screw thread accommodating screw thread of the first clamp element when in use to couple the screw element to the first clamp element. Screw element 70 further includes a second portion 76 which has a right hand screw thread 78 thereon which threadably engages the right hand screw thread accommodating screw thread of the second clamp element when in use to couple the screw element to the second clamp element. Screw element 70 further includes a land portion 80 located between the first and second portions of the screw element. Land portion 80 of the screw element is located in bore 54 of body portion 52 of mount block 50 when the screw element is in use whereby torque wrench accommodating bore 56 is coupled to clamp elements 20 and 22 via mount block 50 and screw element 70 and via clamp elements 20 and 22 to cap 12 of container 14. A knob 82 is mounted on end 84 of the screw element and is used to twist the screw element for operation thereof.

Two lock rings 88 and 90 are mounted on the screw element adjacent to land portion 80 and are accommodated in the cutouts 40 defined in the clamp elements to secure the screw element to the clamp elements. The cutouts thus operate as lock ring accommodating areas in each of the mount blocks.

A torque wrench 100 is coupled to the mount block via the torque wrench accommodating bore defined in the body portion of the mount block to apply torque to the cap via the accessory. A torque measuring device 110 is coupled to the mount block via the torque wrench accommodating bore defined in the body portion of the mount block or via torque wrench 100 to measure the amount of closing torque that has been applied to the cap to apply the cap to the container. The measuring device can be used to assure a proper amount of closing torque is applied to close a container or to measure the amount of torque required to loosen a cap from the container after that cap has already been applied to the container. This step will be used in the event a licensing authority, such as the Department of Transportation, requires assurance that containers being shipped have been capped with the requisite amount of closing torque.

Accessory 10 is used to apply closing torque to and measure closing torque of a cap of a capped container. The method of applying torque or measuring torque comprises the following steps: providing two mount blocks 20 and 22 which are movable toward and away from each other; threadably coupling screw element 70 to each mount block of the two mount blocks; coupling mount element 50 to the screw element. As discussed above, mount element 50 has torque wrench accommodating bore 56 defined therein. Torque wrench 100 is coupled to the torque wrench accommodating bore and the screw element is operated to draw the two mount blocks toward each other and into frictional engagement with cap 12 of container 14 so the torque wrench accommodating bore is coupled to the cap via the mount element and the screw element and the mount blocks. After drawing the mount blocks into frictional engagement with the cap, torque is applied to the cap via the mount element and via the cap-engaged mount blocks. If the closing torque is being measured, torque measuring element 110 is coupled to the torque wrench accommodating bore either directly or via a torque wrench and the amount of torque required to loosen a closed cap is measured.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. An accessory for use in applying closing torque to and measuring closing torque of a cap of a capped container comprising:
   A) first and second clamp elements, each clamp element including
      (1) a first face which is an outer face when the clamp element is in use,
      (2) a second face which is located adjacent to a cap of a container when in use, the second face including an arcuate portion which frictionally engages the cap of the container when the clamp element is in use,
      (3) a bore which extends between the first face and the second face, and
      (4) a screw thread on the clamp element adjacent to the bore, the screw thread on the first clamp element being adapted to accommodate a left hand screw thread and the screw thread on the second clamp element being adapted to accommodate a right hand screw thread;
   B) a mount block which includes
      (1) a body portion which has a bore defined therethrough, the bore in the mount block being aligned with the bores of the clamp elements when the mount block and the clamp elements are in use, and
      (2) a torque wrench accommodating bore defined in the body portion of the mount block;
   C) a screw element which is accommodated in the bores of the clamp elements and the mount block to couple the clamp elements together and the mount block to the clamp element when in use, the screw element including
      (1) a first portion having a left hand screw thread thereon and threadably engaging the left hand screw thread accommodating screw thread of the first clamp element when in use to couple the screw element to the first clamp element,
      (2) a second portion having a right hand screw thread thereon and threadably engaging the right hand screw thread accommodating screw thread of the second clamp element when in use to couple the screw element to the second clamp element, and
      (3) a land portion located between the first and second portions of the screw element, the land portion of the screw element being located in the bore of the body portion of the mount block when the screw element is in use whereby the torque wrench accommodating bore is coupled to the clamp elements via the mount block and the screw element and via the clamp elements to the cap of the container.

2. The accessory defined in claim 1 further including a knob on an end of the screw element.

3. The accessory defined in claim 1 further including a torque wrench which is coupled to the mount block via the torque wrench accommodating bore defined in the body portion of the mount block.

4. The accessory defined in claim 1 further including a torque measuring device which is coupled to the mount block via the torque wrench accommodating bore defined in the body portion of the mount block.

5. The accessory defined in claim 1 further including a lock ring on the screw element and a lock ring accommodating area in one of the mount blocks.

6. The accessory defined in claim 1 wherein the torque wrench accommodating bore includes a two bore portions.

7. A method of applying closing torque to and measuring closing torque of a cap of a capped container comprising:
   A) providing first and second clamp elements;
   B) defining a bore through each clamp element of the first and second clamp elements;
   C) defining a screw thread on each clamp element adjacent to the bore defined therethrough;
   D) providing a mount block;
   E) defining a screw element-accommodating bore through the mount block;
   F) aligning the screw element-accommodating bore in the mount block with the bores in the first and second clamp elements;
   G) defining a torque wrench-accommodating bore in the mount block;
   H) providing a screw element;
   I) threadably coupling the screw element to the screw threads in the first and second clamp elements via the screw element-accommodating bore in the mount block and coupling the clamp elements together and the mount block to the clamp elements;
   J) coupling a torque wrench to the torque wrench-accommodating bore in the mount block;
   K) operating the screw element to draw the first and second mount blocks toward each other and into engagement with a cap of a container so the torque wrench-accommodating bore in the mount block is coupled to the cap of the container via the mount element and the screw element and the first and second clamp elements; and
   L) after drawing the clamp elements into engagement with the cap of the container, applying torque to the cap of the container via the mount element and via the cap-engaged clamp elements.

8. The method defined in claim 7 further including coupling a torque measuring element to the torque wrench accommodating bore and measuring the amount of torque applied to the cap.

9. The method defined in claim 8 further including applying torque to a cap after the cap has been secured to the container and measuring the amount of torque required to loosen the cap from the container.

10. An accessory for use in applying closing torque to and measuring closing torque of a cap of a capped container comprising:
    A) first and second clamp elements, each clamp element including
       (1) a first face which is an outer face when the clamp element is in use,
       (2) a second face which is engages a cap of a container when in use,
       (3) a bore which extends between the first face and the second face, and
       (4) a screw thread on the clamp element adjacent to the bore, the screw thread on the first clamp element being adapted to accommodate a left hand screw thread and the screw thread on the second clamp element being adapted to accommodate a right hand screw thread;

B) a mount block which includes
  (1) a body portion which has a bore defined therethrough, the bore in the mount block being aligned with the bores of the clamp elements when the mount block and the clamp elements are in use, and
  (2) a torque wrench accommodating bore defined in the body portion of the mount block; and
C) a screw element which is accommodated in the bores of the clamp elements and the mount block to couple the clamp elements together and the mount block to the clamp element when in use, the screw element including
  (1) a first portion having a left hand screw thread thereon and threadably engaging the left hand screw thread accommodating screw thread of the first clamp element when in use to couple the screw element to the first clamp element,
  (2) a second portion having a right hand screw thread thereon and threadably engaging the right hand screw thread accommodating screw thread of the second clamp element when in use to couple the screw element to the second clamp element, and
  (3) a land portion located between the first and second portions of the screw element, the land portion of the screw element being located in the bore of the body portion of the mount block when the screw element is in use whereby the torque wrench accommodating bore is coupled to the clamp elements via the mount block and the screw element and via the clamp elements to the cap of the container.

* * * * *